July 15, 1958   J. E. CURRIE   2,843,143
TURNING PLUG FREEING DEVICE FOR VALVES
Filed Sept. 14, 1956
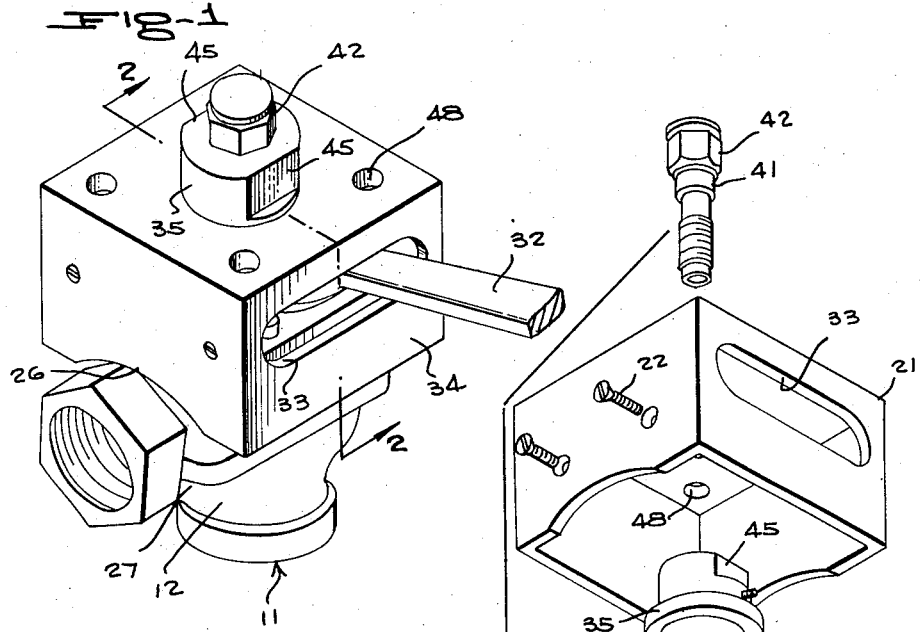
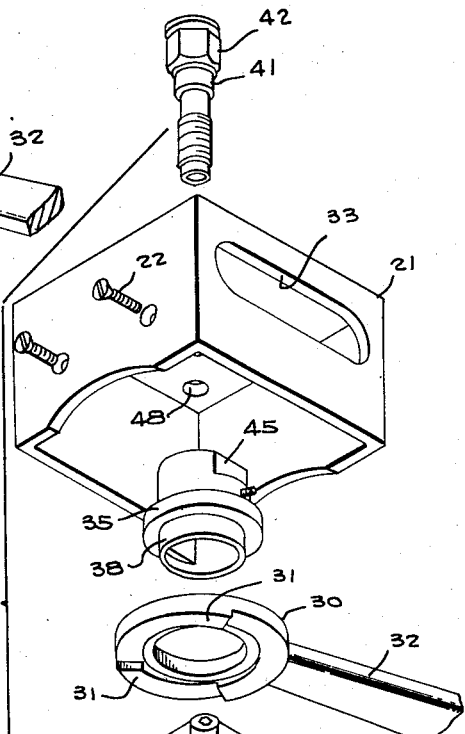
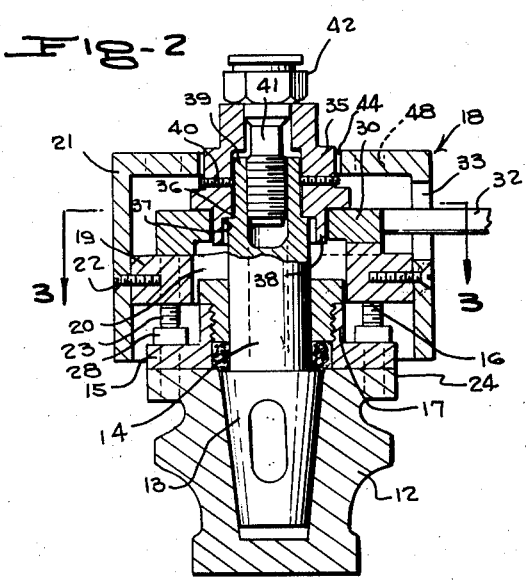
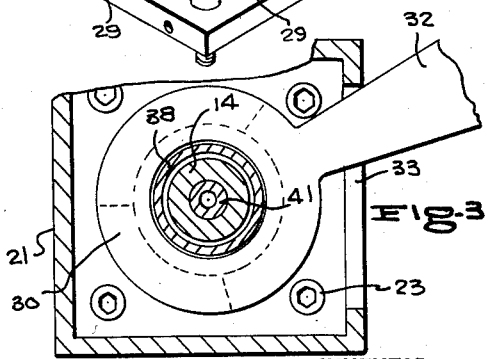
INVENTOR.
JOHN E. CURRIE
BY
McMorrow, Berman & Davidson
ATTORNEYS

2,843,143
TURNING PLUG FREEING DEVICE FOR VALVES

John E. Currie, Lake Charles, La.

Application September 14, 1956, Serial No. 609,962

3 Claims. (Cl. 137—330)

This invention relates to valve attachments, and more particularly to a plug freeing attachment for a valve of the type having a main valve body, a tapered plug seated in the main body, a stem rigidly secured to the plug and a bonnet member secured to the main body surrounding the stem.

A main object of the invention is to provide a novel and improved plug freeing attachment for valve having a rotary plug, said attachment being simple in construction, being easy to install on a valve, and providing a means of lifting the plug element slightly so as to free same for easy rotation, or for lubrication.

A further object of the invention is to provide an improved plug freeing attachment for a valve of the type having a main valve body and a tapered plug seated in the main body for rotation therein, the attachment involving inexpensive components, being compact in size, and being easy to manipulate, whereby the plug of the valve is lifted slightly and freed for rotation by a simple manual operation comprising merely rotating a lever associated with the plug freeing attachment.

Further objects and advantages of the invention will become apparent from the following description and claims, and from the accompanying drawings, wherein:

Figure 1 is a perspective view of a valve provided with an improved plug freeing attachment constructed in accordance with the present invention and shown in installed position on the valve.

Figure 2 is a vertical cross sectional view taken on line 2—2 of Figure 1.

Figure 3 is a horizontal cross sectional view taken on line 3—3 of Figure 2.

Figure 4 is a perspective view showing the parts of the attachment in separated positions.

Referring to the drawings, 11 designates a substantially conventional valve of the type having a main valve body 12, a tapered plug 13 seated in said main body and being rotatable therein around a vertical axis, a stem 14 rigidly secured to the plug 13 and projecting upwardly therefrom, and a bonnet member 15 surrounding the stem and secured on the main body 12, as by the corner cap screws 28. The bonnet member 15 carries an annular bushing member 16 which is threadedly engaged in the upstanding internally threaded collar element 17 on the bonnet member and which sealingly surrounds the valve stem 14.

Designated generally at 18 is a plug freeing attachment comprising a generally rectangular support member 19 having a central aperture 20, whereby the support member 19 may be disposed around the valve stem 14, said aperture being of sufficient diameter to receive the top portion of the sealing bushing 16, as shown in Figure 2. Designated at 21 is a generally rectangular housing which is engageable over the support member 19 and which is secured thereto by fastening bolts 22 extending through the side walls of housing 21 and threadedly engaged in the edge portions of the support 19, as clearly shown in Figure 2. Extending threadedly through the respective corner portions of the support member 19 are respective adjustable supporting cap screws 23 engageable on the heads of the cap screws 28. The cap screws 23 are tightened sufficiently so that the support member 19 is rigidly supported on the cap screws 28. The housing 21 may be provided at the bottom edges of its side walls with arcuate notches 26 which engage over the valve body.

The top wall of the housing 21 is provided at its corner portions with apertures 48 through which a tool may be inserted to engage the heads of the respective supporting cap screws 23 so as to tighten said screws.

As shown in Figure 4, the support member 19 is formed with a plurality of arcuate wedge elements 29 arranged circumferentially around the opening 20, the wedge elements 29 being located on the top surface of the support member 19. Designated at 30 is a ring member which is disposed on the wedge elements 29, said ring member being formed at its bottom surface with cooperating arcuate wedge elements 31 arranged to cooperate with the wedge elements 29 to lift the ring member responsive to rotation of said ring member in a clockwise direction, as shown in Figure 3. Rigidly secured to the ring member 30 is an outwardly extending horizontal lever arm 32 which projects laterallly from the ring member, extending through a slot 33 formed in one side wall 34 of housing 21.

Designated at 35 is an annular collar member having an internally shouldered lower portion 36 engaged on the external annular shoulder portion 37 of valve stem 14, as shown in Figure 2, the collar member having an annular depending flange portion 38 received in the ring member 30 between the ring member and the valve stem 14. The collar member 35 is secured to the reduced upper portion 39 thereof by a plurality of set screws 40 provided in the collar member 35, as shown in Figure 2. A locking bolt 41 is engaged through the collar member 35 and is threadedly engaged in the valve stem 14, the head of the bolt, shown at 42, bearing on the top rim of the collar member 35, and cooperating with the set screws 40 to rigidly secure the valve stem to the collar member 35.

The top wall of housing 21 is formed with a central aperture 44 through which collar member 35 extends.

The top end of the collar member 35 is formed on its opposite sides with flattened surfaces 45, whereby said top end may be engaged by a conventional wrench or similar implement to rotate the valve plug 13 after it has been loosened sufficiently.

The cooperating wedge elements 29 and 31 are of sufficient height to lift the valve plug 13 sufficiently to loosen same, for example, to lift said valve plug a distance of the order of several thousandths of an inch, responsive to the rotation of the ring 30 on the arcuate wedge elements 29. Thus, when it is desired to loosen the valve 13 for rotation, it is merely necessary to rotate the lever arm 32 clockwise from the position shown in Figure 3 from one end of slot 33 to the other, whereby the wedge elements 29 and 31 cooperate to lift the plug 13 slightly, sufficiently to release the plug from its seat and to allow the plug to be easily rotated by means of a wrench or similar implement engaged on the flattened surfaces 45 of collar member 35.

It will be understood that the valve itself is conventional and forms no part of the present invention, and that the device 18 is intended to be installed on a conventional valve for the purpose of facilitating the freeing of the valve plug when it is desired to rotate said plug.

While a specific embodiment of an improved valve plug freeing attachment has been disclosed in the foregoing description, it will be understood that various

What is claimed is:

1. A plug freeing attachment for a valve of the type having a main valve body, a tapered plug seated in said main body, a stem rigidly secured to said plug, and a bonnet member secured on said main body surrounding said stem, said attachment comprising a support member formed and arranged to be disposed around said stem, means on said support member adjustable toward and engageable with said main valve body for supporting said support member on said main valve body over said bonnet member and surrounding said stem, said support member being formed with a plurality of arcuate wedge elements extending in succession around said stem, a ring element rotatably disposed on said support member, a plurality of arcuate wedge elements on the undersurface of said ring element inclined similarly to and slidably engaging said first named wedge elements, a collar member, means for securing said collar member to said stem, means on said collar member engageable with said ring element to transfer upward force to said stem responsive to wedging cooperation of said first and second named wedge elements responsive to rotation of said ring element relative to said support member, and a handle member rigidly secured to and projecting outwardly from said ring element.

2. A plug freeing attachment for a valve of the type having a main valve body, a tapered plug seated in said main body, a stem rigidly secured to said plug, a stud bolt threaded axially into the end of said stem, and a bonnet member secured on said main body surrounding said stem, said attachment comprising a support member formed and arranged to be disposed around said stem, means threadedly engaged with said support member and being adjustable to engage said main valve body for supporting said support member on said main valve body over said bonnet member and surrounding said stem, said support member being formed with a plurality of arcuate wedge elements extending in succession around said stem, a ring element rotatably disposed on said support member, a plurality of arcuate wedge elements on the undersurface of said ring element inclined similarly to and slidably engaging said first named wedge elements, a collar member, means for securing the collar member to said stem, an upstanding annular portion on the top end of said collar member engageable by the head of said stud bolts, means on said collar member engageable with said ring element to transmit upward force to said stem responsive to wedging cooperation of said first and second named wedge elements responsive to rotation of said ring element relative to said support member, and a handle member rigidly secured to and projecting outwardly from said ring element.

3. A plug freeing attachment for a valve of the type having a main valve body, a tapered plug seated in said main body, a stem rigidly secured to said plug, a stud bolt threaded axially in the end of said stem, and a bonnet member secured on said main body surrounding said stem, said attachment comprising a support member formed and arranged to be disposed around said stem, means threadedly engaged with said support member and being adjustable to engage said main valve body for supporting said support member on said main valve body over said bonnet member and surrounding said stem, said support member being formed with a plurality of arcuate wedge elements extending in succession around said stem, a ring element rotatably disposed on said support member, a plurality of arcuate wedge elements on the undersurface of said ring element inclined similarly to and slidably engaging said first named wedge elements, a collar member, means for securing said collar member to said stem, an upstanding annular portion on the top end of said collar member engageable by the head of said stud bolt, means on said collar member engageable with said ring element to transmit upward force to said stem responsive to wedging cooperation of said first and second named wedge elements responsive to rotation of said ring element relative to said support member, a housing member engageable over said collar member and said support member, means securing said housing member to the outer edges of said support member, said housing member being formed with a horizontal slot in the side wall thereof, and a handle member rigidly secured to and projecting outwardly from said ring element through said slot.

References Cited in the file of this patent

UNITED STATES PATENTS

| | | |
|---|---|---|
| 1,434,832 | Long | Nov. 7, 1922 |
| 1,466,828 | Hanley | Sept. 4, 1923 |
| 1,715,176 | Stevens | May 28, 1929 |
| 1,815,113 | Nachtsheim | July 21, 1931 |
| 1,881,953 | Redding | Oct. 11, 1932 |
| 2,035,548 | Johnson | Mar. 31, 1936 |